(12) United States Patent
Schmier, II et al.

(10) Patent No.: US 8,337,654 B2
(45) Date of Patent: Dec. 25, 2012

(54) CONFIGURABLE TOOLING AND MOLDING METHOD USING THE SAME

(75) Inventors: Mark A. Schmier, II, Mesa, AZ (US); Dwight L. Engwall, Mesa, AZ (US); Carlos Pena, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 436 days.

(21) Appl. No.: 11/747,506

(22) Filed: May 11, 2007

(65) Prior Publication Data

US 2008/0277058 A1 Nov. 13, 2008

(51) Int. Cl.
*B29C 70/00* (2006.01)
*B28B 17/00* (2006.01)

(52) U.S. Cl. ........ 156/245; 156/242; 249/102; 264/255; 425/183

(58) Field of Classification Search ................ 516/102; 425/DIG. 239, 182–196; 249/64, 102, 155; 264/219, 250–258
See application file for complete search history.

(56) References Cited

U.S. PATENT DOCUMENTS

| | | | | |
|---|---|---|---|---|
| 3,336,873 A | * | 8/1967 | Wilford | 264/3.1 |
| 3,939,024 A | * | 2/1976 | Hoggatt | 156/242 |
| 4,162,496 A | * | 7/1979 | Downen et al. | 342/4 |
| 5,320,700 A | * | 6/1994 | Hall et al. | 156/309.6 |
| 5,393,479 A | * | 2/1995 | Nadeau | 264/219 |
| 5,824,249 A | * | 10/1998 | Leitch et al. | 264/219 |
| 6,012,883 A | | 1/2000 | Engwall | |
| 6,168,358 B1 | | 1/2001 | Engwall | |
| 6,746,553 B2 | | 6/2004 | Yao et al. | |
| 6,796,784 B1 | * | 9/2004 | Andre | 425/195 |
| 2006/0108058 A1 | * | 5/2006 | Chapman et al. | 156/245 |
| 2006/0170127 A1 | * | 8/2006 | Hirayama et al. | 264/102 |
| 2007/0063378 A1 | * | 3/2007 | O'Donoghue | 264/219 |
| 2007/0096359 A1 | * | 5/2007 | Torfs et al. | 264/219 |

OTHER PUBLICATIONS

Peters, S.T, Handbook of Composites, 2nd Edition, 1998, Springer-Verlag, pp. 21-33.*

* cited by examiner

*Primary Examiner* — William Bell
(74) *Attorney, Agent, or Firm* — Hanley, Flight & Zimmerman, LLC

(57) ABSTRACT

Configurable layup tooling is used to fabricate reinforced composite parts have a common shape but varying features. The tooling includes a tool base, multiple mandrels and optionally, a tool insert, all of which may be used to form a portion of the common shape. The mandrels have differing tool geometries for forming the varying features of the commonly shaped parts. The tool base may be used as a bonding jig to assemble and bond assemblies that include the fabricated parts.

22 Claims, 6 Drawing Sheets

CONFIGURABLE TOOLING AND MOLDING METHOD USING THE SAME

TECHNICAL FIELD

This disclosure generally relates to the fabrication of reinforced composite parts, and deals more particularly with a method and configurable tooling for molding and assembling multiple parts having a common shape but differing part features.

BACKGROUND

In fabricating composite material part assemblies, there is sometimes a need to fabricate multiple assemblies that have the same shape but differ in part details or features. These composite material assemblies may be fabricated by laying up multiple plies of fiber reinforced synthetic resin which is then formed or molded into particular shapes using layup tooling. The layup tooling may comprise male and/or female layup tools that are used to compact the plies and form part features corresponding to the geometry of the tools.

Normally, even minor variations in part features require the fabrication of an entirely new set of layup tooling which is expensive, particularly in short run productions and prototyping applications, or where multiple sets of tooling are needed for high quantity production runs.

Accordingly, there is a need for a method of fabricating composite material layups with minimum tooling changes that overcomes the problems discussed above. Embodiments of the disclosure are intended to satisfy this need.

SUMMARY

The disclosed embodiments provide flexible, configurable tooling that allows variations to made in parts with minimum changes in tooling. The tooling includes a set of standard tools used to produce all variations of a common part, and one or more interchangeable tools that are used with the standard tool set to produce varying part features.

The interchangeable tools may comprise, for example, mandrels and/or inserts that can be used with the standard tool set for producing parts having common features such as identical shapes, but varying details. The reconfigurable tooling eliminates the need to duplicate the entire set of tools in order to fabricate a part, and reduces the time required for re-tooling.

According to a method embodiment of the disclosure, a method is provided for manufacturing at least first and second common parts having different features. The method comprises the steps of: fabricating a tool body; fabricating first and second tool members, each insertable into the tool body for forming first and second common parts respectively having differing features; and, using the first and second tool members with the tool body to manufacture the first and second common parts. The first part may be manufactured by inserting a first mandrel into the tool body, forming a first layup by placing multiple plies of reinforced thermoplastic resin over the first mandrel, curing the first layup to form the first part and removing the first part from the tool body. The second part may be fabricated by removing the first mandrel from the tool body, inserting a second mandrel into the tool body, forming a second layup by placing multiple plies of reinforced thermoplastic resin over the second mandrel, curing the second layup to form the second part, and removing the second part from the tool body. Inserts may be placed in the tool body before the mandrels are installed to form either common features or variations in part features.

According to another method embodiment, assembly parts are produced having a common shape but differing features. The method comprises the steps of: placing a first mandrel into a tool body; laying up multiple plies of reinforced synthetic resin over the first mandrel; compacting curing the layup over the first mandrel to form a first part having a shape formed by the tool body and surface features formed by the first mandrel; removing the first part from the tool body; placing a second mandrel into the tool body; laying up multiple plies of reinforced synthetic resin over the second mandrel; compacting and curing the layup over the second mandrel to form a second part having a shape formed by the tool body and surface features formed by the second mandrel; and, removing the second part from the tool body.

In another method embodiment of the disclosure, a method is provided for fabricating common aircraft part assemblies having variations in at least certain parts. The method comprises the steps of: fabricating a set of tooling including at least one common tool and at least first and second interchangeable tools; molding a first part using the common tool and the first interchangeable tool; assembling a first part assembly using the common tool and the first part; molding a second part using the common tool and the second interchangeable tool; and, assembling a second part assembly using the common tool and the second part. The method may further comprise: assembling the common tool with the first interchangeable tool before the first part is molded; and, assembling the common tool with the second interchangeable tool before the second part is molded. The common tool may be used as a jig to hold parts during the part assembly steps.

According to a further disclosed embodiment, configurable layup tooling is provided for producing reinforced composite parts having a common shape but differing features. The tooling comprises: a tool body; a first mandrel receivable within the tool body for forming at least a first portion of the common shape and a first set of features in a first part; and, at least a second mandrel receivable within the tool for forming the first portion of the common shape and a second set of features in a second part differing from the first set of features. The tool body may include surface areas for forming a second portion of the common shape. The layup tooling may further comprise a tool insert received within the tool body for forming a third portion of the common shape.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
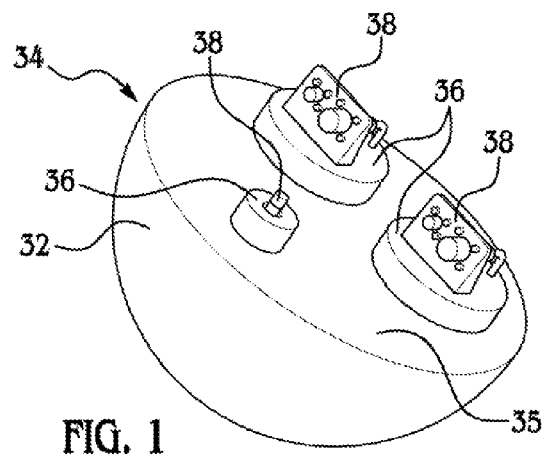
FIG. 1 is a perspective illustration of one form of an antenna assembly having a part formed of composite materials using the method and configurable layup tooling according to the disclosed embodiments.
Figure 2:
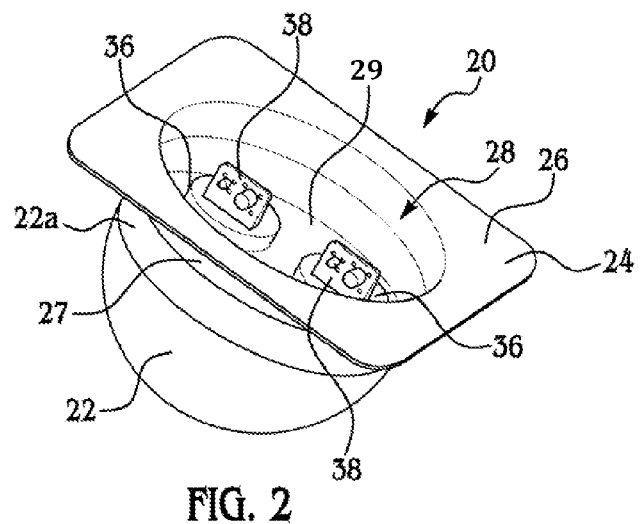
FIG. 2 is a perspective illustration of an antenna module forming part of the antenna assembly shown in FIG. 1.
Figure 3:
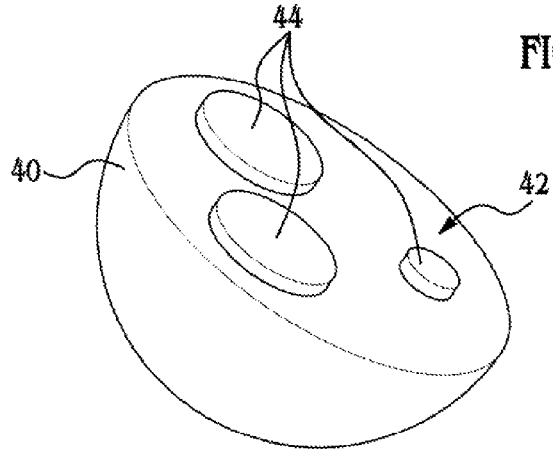
FIG. 3 is a perspective illustration of a mandrel forming part of the layup tooling used to fabricate the part used in the assembly illustrated in FIG. 1.
Figure 4:
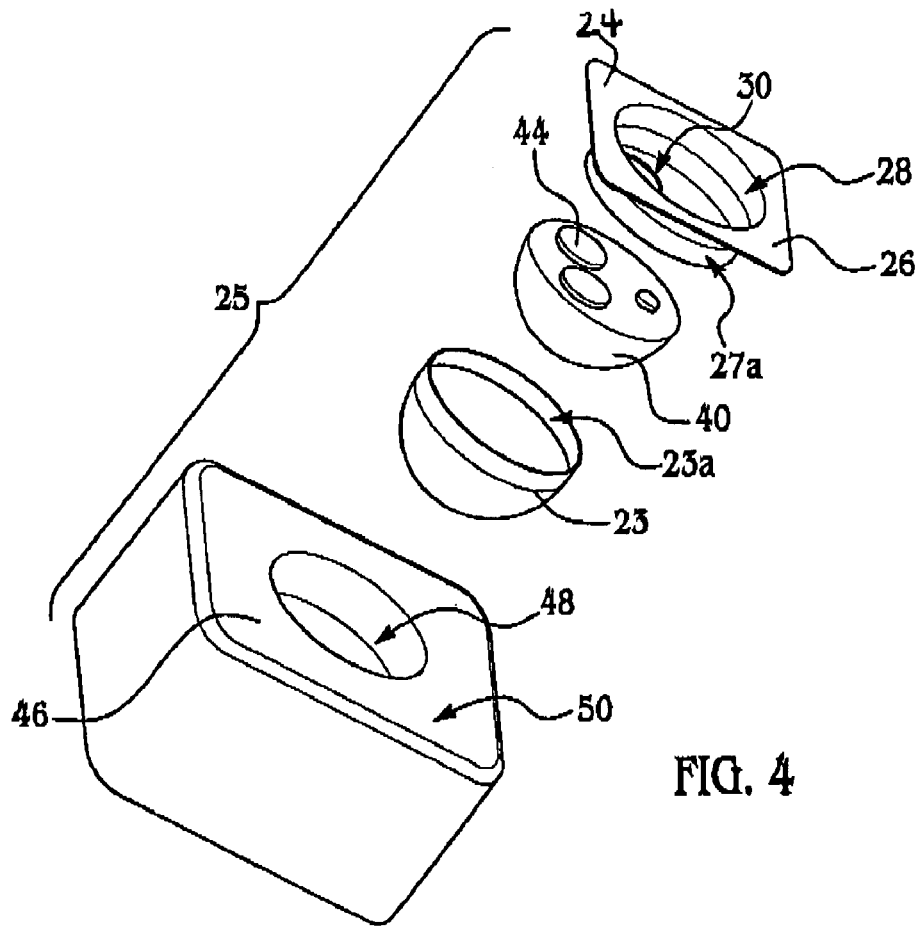
FIG. 4 is an exploded, perspective illustration of configurable layup tooling, and the part molded thereby.

Referring to FIGS. 1-8, the disclosed embodiments relate to configurable tooling 25 that may be used in a method of molding and assembling composite parts that have identical shapes or features but with variation of certain part details. The parts and/or part assemblies may be referred to herein as common parts or common assemblies in the sense that they represent variations of a single part or assembly design. For purposes of illustration, a radar assembly 20 is shown in FIG. 1 that is typical of a wide variety of products and assemblies that may have variations in one or more parts fabricated using the configurable tooling and molding method described herein. The radar assembly 20 broadly comprises an antenna module 34 having a hemispherical body 32 covered by a hemispherical radome 22 and mounted on a support structure 24. The antenna module 34 includes three raised, cylindrically shaped lands on the flat base 35 thereof, upon which electronic components or printed circuit boards 38 may be mounted. The radome 22 forms a protective cover over the hemispherical body 32 of the antenna module 34.

The support structure 24 includes a generally square, flat base 26 and a cylindrical recess 28 defined by a cylindrical wall 27 and a flat bottom wall 29. The bottom wall 29 has three circular openings 30 through which the lands 36 extend. The cylindrical wall 27 includes a reduced diameter portion 27a which is overlapped by a lower margin 22a of the radome 22. The radome 22 may be manufactured from any suitable material that is transparent to radio waves. As will be discussed in more detail below, the support structure 24 is formed from laminated plies of a reinforced synthetic resin, such as a fiber reinforced epoxy.

The support structure 24 is molded using configurable tooling 25 which, in the present example, comprises a tool base 46, an insert 23, and a mandrel 40. The tool base 46 includes a hemispherical cavity 48 surrounded by an upper flat surface 50. The insert 23 has a shape and dimensions essentially identical to the radome 22 forming part of the radar assembly 20, including a lower margin 23a. The insert 23 is complementally received within the cavity 48 in the tool base 46.

The mandrel 40 is formed from any suitable, rigid material and has a shape and features identical to those of the antenna module 34, including cylindrical tooling features 44 extending from a base 42. Generally, however, the materials from which the items of tooling are formed should have closely matched CTEs (coefficient of thermal expansion). For example, the tool base 46, insert 23 and mandrel 40 may all be constructed of an FeNi metal alloy, such Invar®. The mandrel 40 is placed within the insert 23, which in turn is received in the tool base cavity 48.

Figure 7:
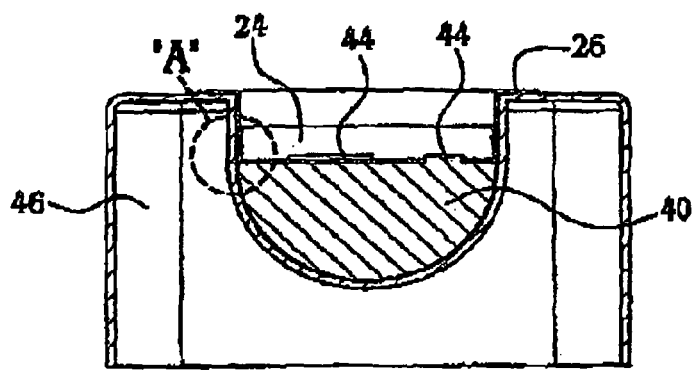
FIG. 7 is a sectional illustration taken along line 7-7 in FIG. 6.
Figure 8:
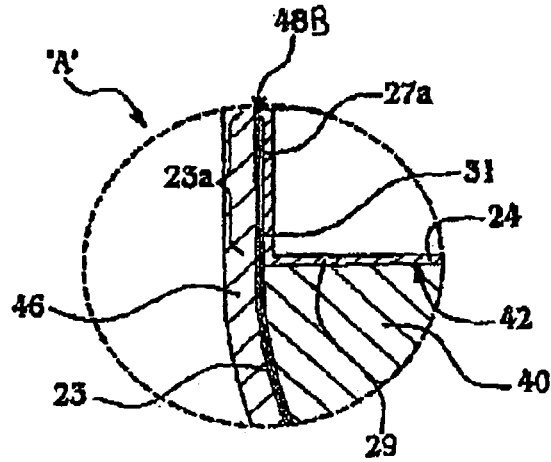
FIG. 8 is a sectional illustration of the area designated as "A" in FIG. 7.
Figure 9:
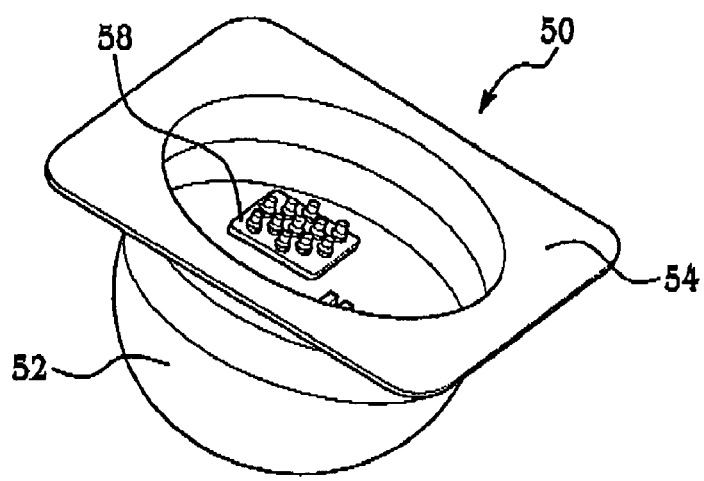
FIG. 9 is a perspective illustration of another form of an antenna assembly having a shape identical to the assembly in FIG. 1, but in which the composite material part has different feature details.
Figure 10:
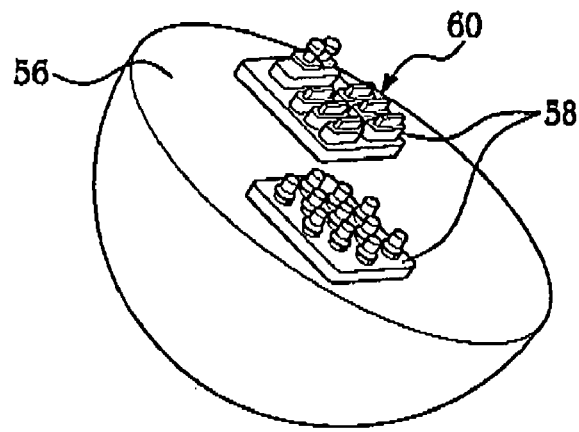
FIG. 10 is a perspective illustration of an antenna module forming part of the antenna assembly shown in FIG. 9.
Figure 11:
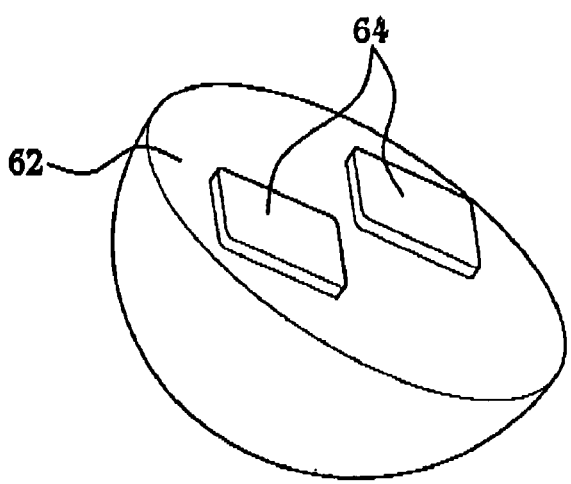
FIG. 11 is a perspective illustration of a mandrel used to form one of the composite material part shown in FIG. 9.

As best seen in FIGS. 7 and 8, the base 42 of the mandrel 40 forms a tooling surface surrounded by the marginal portion 23a of the insert 23. Further, a coating 31 of material applied to the TML (inner mold line) of the radome insert forms an offset that is used to accommodate a bond line when the parts are assembled, as will be described later. The combination of the radome insert 23 and the coating 31 form a tooling feature that forms a shoulder 48B on the support structure 24.

Figure 5:
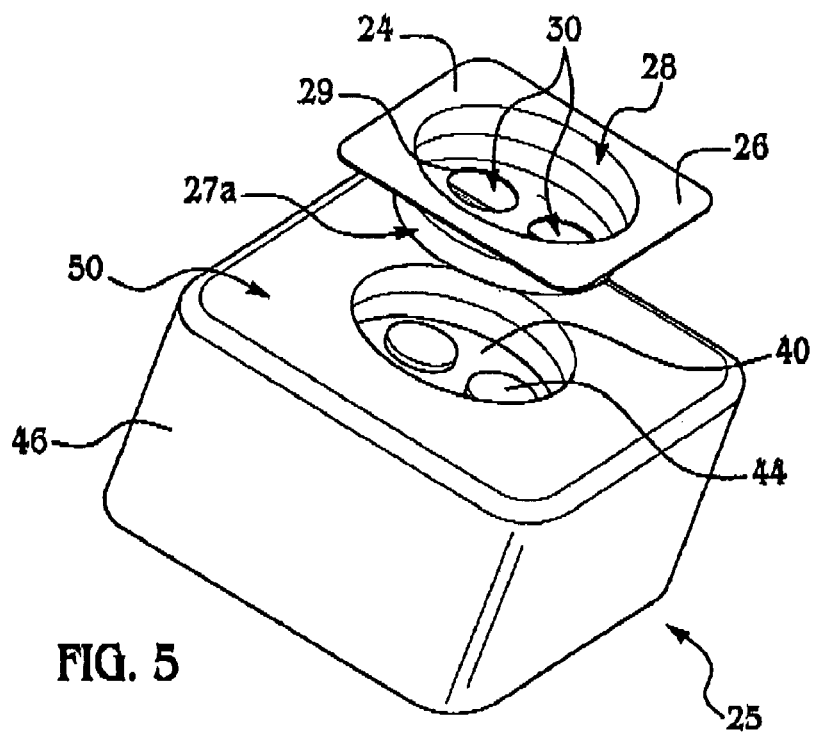
FIG. 5 is an illustration similar to FIG. 4 but showing the configurable layup tooling in an assembled state.
Figure 6:
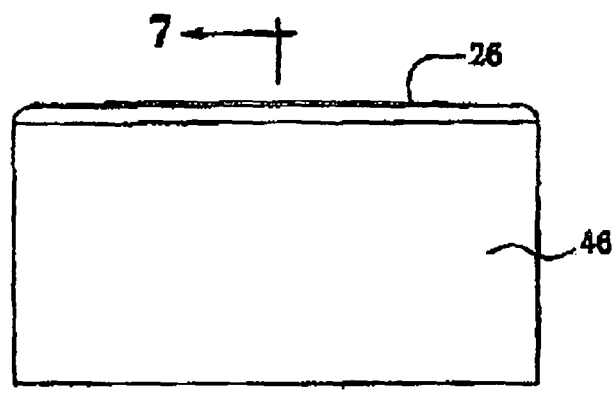
FIG. 6 is an elevational illustration of the assembled layup tooling shown in FIG. 5.

With the configurable tooling 25 assembled as shown in FIG. 5, multiple plies of fiber reinforced, uncured or semi-cured resin are successively laid up over the upper surface 50 of the tool base 46. These multiple plies are forced down into the upper portion of the cavity 48, onto the base 42 of the mandrel 40. As will be discussed below, the layup is then compacted using conventional vacuum bagging and autoclaving, and subjected to elevated temperature in order to cure the compacted layup. The CTEs of the parts formed on the reconfigurable tooling 25 should be closely matched. Following the cure cycle, the support structure part 24 is removed from the mold assembly and trimmed. The trimming may comprise trimming the edges of the base 26 and cutting material away to form the openings 30 through which the lands 36 will extend. As will be described below, the tool base 46 may be subsequently used as a bonding jig to assemble the parts of the radar assembly 20.

In the present example, the insert 23 may be used to fabricate variations of the support structure 24, however the insert 23 may comprise a radome 22 manufactured with other tooling. The tool body 46 and the insert 23 comprise standard layup tooling that may be used to fabricate support structures having the general shape of the support structure 26 illustrated in FIGS. 1-8, but with variations in certain details. For example, as shown in FIGS. 9-13, a radar assembly 50 includes a radome 52, antenna module 56 and a support structure 54.

The radome 52 and antenna module 56 are identical to the radome 22 and antenna assembly 34 shown in FIGS. 1-8. However, the antenna module 56 includes two square lands 58, rather than three round lands 36 (see FIGS. 1 and 3) upon which electronic components 60 are mounted. Thus, the support structure 54 includes rectangular, rather than circular openings in the bottom wall thereof for receiving the square lands 58. It may thus be appreciated that the support structure 54 is identical to the support structure 24 shown in FIGS. 1-8, with the exception that the openings in the bottom wall thereof comprise two square openings 66, rather than three round openings 36 shown in FIGS. 1-8.

Figure 12:
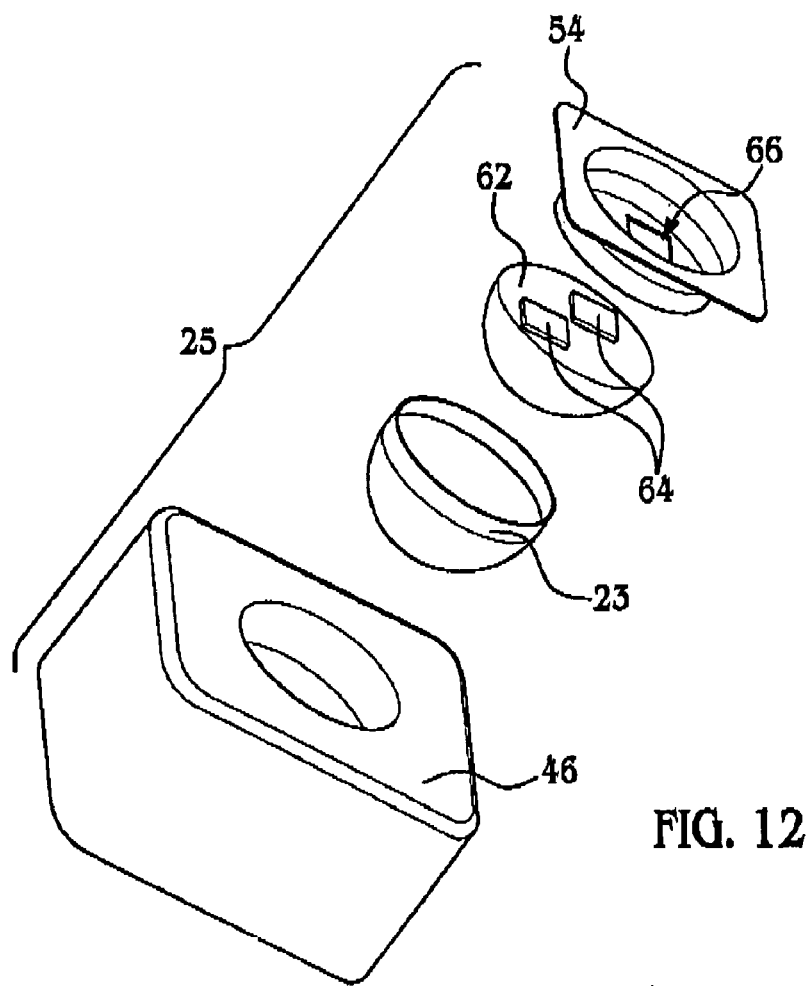
FIG. 12 is an exploded, perspective illustration of the configurable layup tooling including an alternate form of the mandrel, and the part molded thereby.
Figure 13:
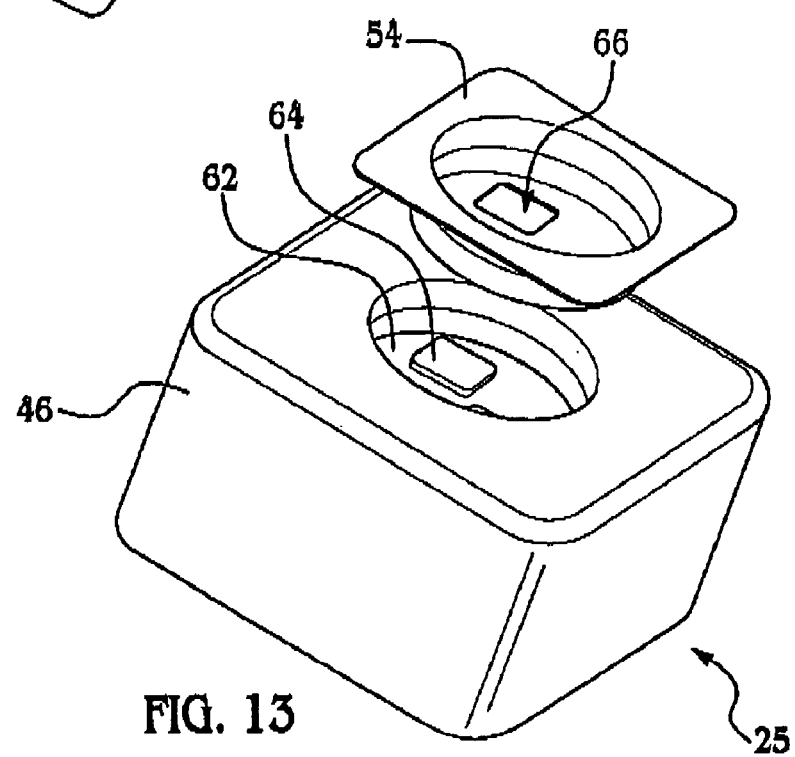
FIG. 13 is a perspective illustration similar to FIG. 12, but showing the layup tooling in its assembled state.

The support structure 54 is fabricated using the tooling 25 shown in FIGS. 12 and 13, which comprise a tool base 46 and an insert 23, identical to those described in connection with FIGS. 1-8, and a mandrel 62. The mandrel 62, however, includes a pair of square tooling features 64 on the base thereof for forming the rectangular openings 66. Thus, it can be appreciated that the mandrel 62 is identical to, and interchangeable with, the mandrel 40 described in FIGS. 1-8 with the exception that two, square tooling features 64 are provided, rather than the three circular features 44 shown in FIGS. 1-8. Similarly, different forms of the insert could be interchangeably employed that have the same shape but differing feature details.

Figure 14:
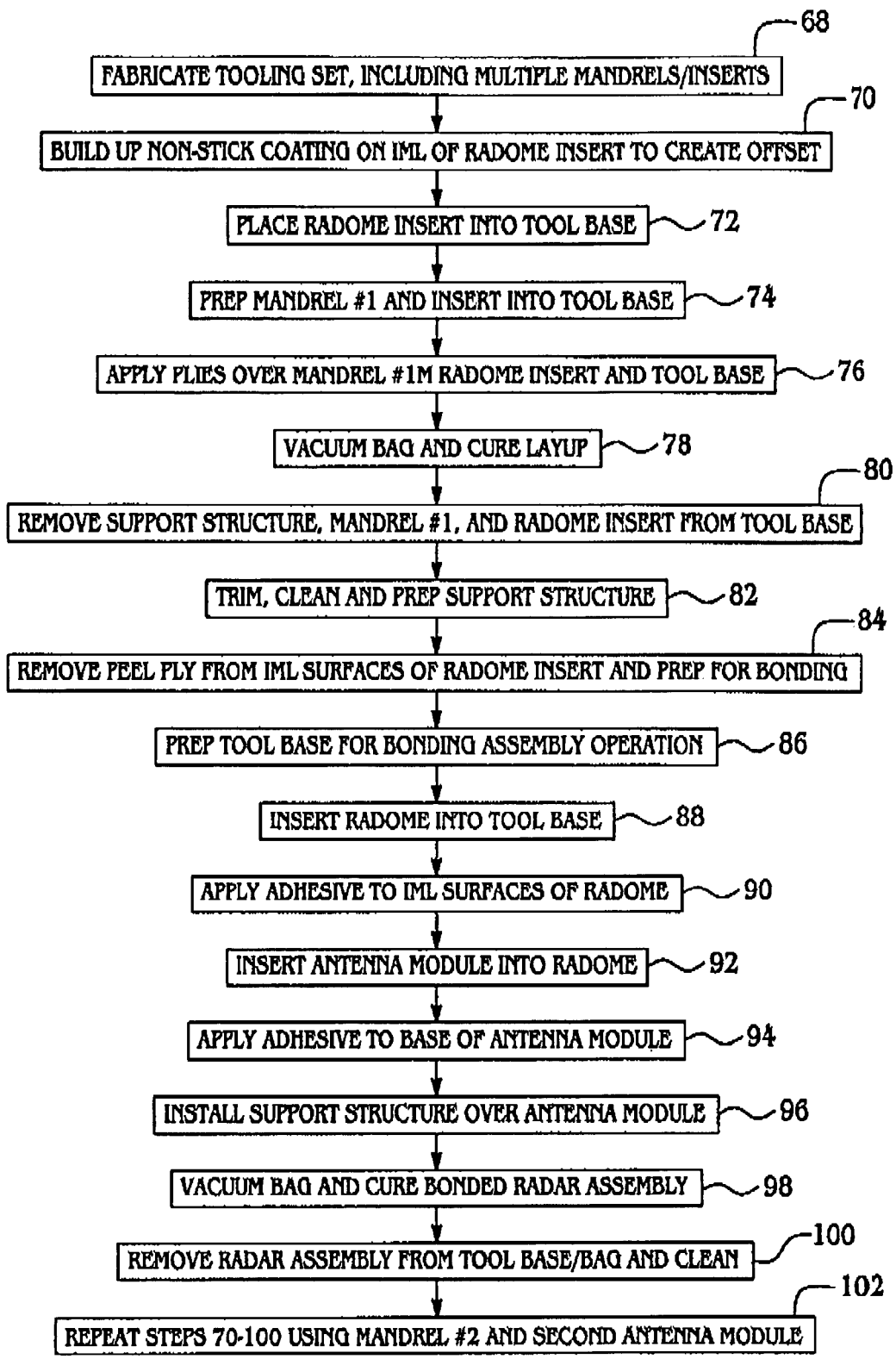
FIG. 14 illustrates in block diagram form the overall steps of a molding method using configurable layup tooling.

Referring now also to FIG. 14, a method of molding and assembling parts employs the configurable tooling 25 shown in FIGS. 1-13, comprising the tool base 46, the radome insert 23 and the interchangeable mandrels 40, 62. Beginning at step 68, the tooling 25 is fabricated, including interchangeable mandrels 40, 62, as well as one or more forms of the radome insert 23. Next, at step 70, a coating 31 of non-stick material is applied on the inside surface of the radome insert 23 which builds up a layer on the IML of the insert 23 to create an offset that later functions to accommodate a bond line between the radome 23 and the support structure 24.

At step 72, the radome insert 23 is placed into the cavity 48 in the tool base 46. Next at step 74, the first mandrel 40 is then prepared by coating it with a mold release following which it is placed into the radome insert 23 inside the tool base 46.

Next, at step 76, a plurality of plies of reinforced resin, such as fiber reinforced epoxy are applied over the base 42 of the mandrel 40, as well as over the sides of the radome insert 23, the inner wall of the tool base 46 and the upper flat surface 50 of the tool base 46. The lay-up is then vacuum bagged, compacted and cured at step 78 in the conventional manner.

At step 80, the support structure 24 is removed from the tool assembly, and the first mandrel 46 as well as the radome insert 23 are removed from the tool base 46. At step 82, the cured support structure 24 is trimmed, cleaned and prepped for a later assembly operation. At step 84, the peel ply is removed from the IML surfaces of the radome insert 23 which is then prepared for a bonding operation. At step 86, the tool base 46 is prepared for a boding operation by cleaning it and then applying mold release to its surfaces, as required. Next, at step 88 the radome 23 is inserted into the tool base which will be utilized in subsequent steps as a bonding tool jig.

At step 90, an adhesive is applied to the IML surfaces of the radome 23, along the marginal areas 23a. Next, at step 92, antenna module 34 is inserted into the radome 23 which was previously been placed into the tool base 46. At step 94, adhesive is applied to the base surface 35 of the antenna module 34.

Next, at step 96, the support structure 24 is installed over the antenna module 34, following which, at step 98, the entire, bonded radar assembly 20 is vacuum bagged and cured while in the tool base 46.

At step 100, the radar assembly 20 is removed from the tool base 46 and cleaned. Finally, as shown at 102, steps 70-100 are repeated in order to fabricate the second support structure configuration 54 using the second mandrel 62, and then assemble the parts to form a second form of the radar assembly 50.

From the forgoing, it may appreciated that the configurable tooling 25 having interchangeable mandrels and inserts can be used to both fabricate variations of the same part, and assemble the parts into products that have variations in part details or features.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method comprising:
   placing a first mandrel into an opening of a common tool to define a first cavity having an open top, the first mandrel defining a first inner bottom surface of the first cavity and a first feature;
   laying up multiple plies of reinforced synthetic resin in the first cavity and over the first mandrel to form a first layup;
   compacting and curing the first layup to form a first support part having a first shape formed by the common tool and the first feature defined by the first mandrel;
   removing the first support part from the common tool;
   placing a second mandrel into the opening of the common tool to define a second cavity having an open top, the second mandrel defining a second inner bottom surface of the second cavity and a second feature;
   laying up multiple plies of reinforced synthetic resin in the second cavity and over the second mandrel to form a second layup;
   compacting and curing the second layup to form a second support part having a second shape formed by the common tool and the second feature defined by the second mandrel, the first shape of the first support part being substantially similar to the second shape of the second support part and the first feature being different than the second feature;
   removing the second support part from the common tool; and
   placing a common insert in the opening of the common tool prior to inserting the first mandrel in the opening of the common tool, the common insert to receive the first mandrel such that at least a portion of a wall of the common insert, the first mandrel and the common tool define the first cavity.

2. The method of claim 1, further comprising forming the first support part to have a first body substantially similar to a second body of the second support part.

3. The method of claim 1, further comprising:
   removing the first mandrel from the common tool; and
   forming the second support part by inserting the second mandrel into the opening of the common tool, the second mandrel having a second planar surface and second surfaces protruding from the second planar surface to define the second feature.

4. The method of claim 1, further comprising trimming portions of at least one of the first or second support parts.

5. The method of claim 1, wherein inserting the first mandrel into the common tool comprises inserting the first mandrel into the common insert.

6. The method of claim 1, further comprising fabricating a tool insert having a shape and dimension of a third part that is to be assembled with each of the first and second support parts.

7. The method of claim 1, further comprising
   assembling a first part assembly using the common tool and the first part; and
   assembling a second part assembly using the common tool and the second part.

8. The method of claim 7, wherein assembling the first part assembly comprises using the common tool as a jig to hold a plurality of parts during assembly.

9. The method of claim 7, further comprising holding the first support part in the common tool while assembling the first part assembly.

10. The method of claim 1, further comprising laying up multiple plies of fiber reinforced resin over the first mandrel, the wall of the common insert, the first cavity and the common tool to form the first support part of a first part assembly.

11. The method of claim 1, further comprising placing the common insert in the opening of the common tool prior to inserting the second mandrel in the opening of the common tool, the common insert to receive the second mandrel such that the at least the portion of the wall of the common insert, the second mandrel and the common tool define the second cavity.

12. The method of claim 11, further comprising laying up multiple plies of fiber reinforced resin over the second mandrel, the wall of the common insert, the second cavity and the common tool to form the second support part of a second part assembly.

13. The method of claim 1, further comprising forming the first feature as first protruding surfaces having circular shapes and forming the second feature as protruding surfaces having square shapes.

14. The method of claim 1, further comprising curing the first layup in the first cavity to form the first support part.

15. The method of claim 1, further comprising curing the second layup in the second cavity to form the second support part.

16. A method comprising:
  placing a first mandrel into an opening of a common tool to define a first cavity having an open top, the first mandrel defining a first inner bottom surface of the first cavity and a first feature;
  laying up multiple plies of reinforced synthetic resin in the first cavity and over the first mandrel to form a first layup;
  compacting and curing the first layup to form a first support part of a first part assembly having a first shape formed by the common tool and the first feature defined by the mandrel;
  removing the first support part from the common tool;
  placing a second mandrel into the opening of the common tool to define a second cavity having an open top, the second mandrel defining a second inner bottom surface of the second cavity and a second feature;
  laying up multiple plies of reinforced synthetic resin in the second cavity and over the second mandrel to form a second layup;
  compacting and curing the second layup to form a second support part having a second shape formed by the common tool and the second feature defined by the second mandrel, the first shape of the first support part being substantially similar to the second shape of the second support part and the first feature being different than the second feature;
  removing the second support part from the common tool; and
  placing an insert part of the first part assembly in the opening of the common tool, applying adhesive to at least a portion of the insert part, placing a module of the first part assembly in the insert, and placing the first support part over the module.

17. The method of claim 16, further comprising placing the insert part into the common tool prior to placing the first mandrel into the opening of the common tool.

18. The method of claim 16, further comprising bonding the insert part, the module and the first support via vacuum bagging and curing processes to form the first part assembly.

19. The method of claim 18, wherein the module comprises an antenna module and the insert part comprises a radome.

20. The method of claim 16, further comprising forming the first feature as first protruding surfaces having circular shapes and forming the second feature as protruding surfaces having square shapes.

21. A method comprising:
  placing a first mandrel into an opening of a common tool to define a first cavity having an open top, the first mandrel defining a first inner bottom surface of the first cavity and a first feature;
  laying up multiple plies of reinforced synthetic resin in the first cavity and over the first mandrel to form a first layup;
  compacting and curing the first layup to form a first support part having a first shape formed by the common tool and the first feature defined by the mandrel;
  removing the first support part from the common tool;
  placing a second mandrel into the opening of the common tool to define a second cavity having an open top, the second mandrel defining a second inner bottom surface of the second cavity and a second feature;
  laying up multiple plies of reinforced synthetic resin in the second cavity and over the second mandrel to form a second layup;
  compacting and curing the second layup to form a second support part of a second part assembly having a second shape formed by the common tool and the second feature defined by the second mandrel, the first shape of the first support part being substantially similar to the second shape of the second support part and the first feature being different than the second feature;
  removing the second support part from the common tool; and
  placing an insert part of the second part assembly in the opening of the common tool, applying adhesive to at least a portion of the insert part, placing a module of the second part assembly in the insert, and placing the second support part over the module.

22. The method of claim 21, further comprising bonding the module, the insert part and the second support via a vacuum bagging and curing manufacturing processes to form the second part assembly.

* * * * *